United States Patent
Hamano et al.

(10) Patent No.: US 7,365,913 B2
(45) Date of Patent: Apr. 29, 2008

(54) ZOOM LENS SYSTEM AND CAMERA INCORPORATING THE SAME

(75) Inventors: Hiroyuyki Hamano, Tokyo (JP); Hiroshi Saruwatari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 993 days.

(21) Appl. No.: 10/665,078

(22) Filed: Sep. 16, 2003

(65) Prior Publication Data

US 2004/0056969 A1 Mar. 25, 2004

(30) Foreign Application Priority Data

Sep. 19, 2002 (JP) .............................. 2002-273680

(51) Int. Cl.
 *G02B 15/14* (2006.01)
(52) U.S. Cl. ...................................... 359/687; 359/683
(58) Field of Classification Search ................. 359/687
 See application file for complete search history.

(56) References Cited

U.S. PATENT DOCUMENTS

2002/0063969 A1* 5/2002 Hamano et al. ............ 359/687
2002/0118467 A1* 8/2002 Ozaki ........................ 359/687
2003/0063395 A1* 4/2003 Saruwatari .................. 359/687
2003/0197950 A1* 10/2003 Eguchi ....................... 359/687

FOREIGN PATENT DOCUMENTS

| JP | 7-270684 | 10/1995 |
| JP | 10-062687 | 3/1998 |
| JP | 11-305124 | 11/1999 |
| JP | 2001-194586 | 7/2001 |

\* cited by examiner

*Primary Examiner*—Jordan M. Schwartz
(74) *Attorney, Agent, or Firm*—Morgan & Finnegan, L.L.P.

(57) ABSTRACT

A zoom lens system comprises a 1st lens unit with positive optical power consisting of one lens element, a 2nd lens unit with negative optical power, a 3rd lens unit with positive optical power and a 4th lens unit with positive optical power, in order from the object side to the image side is disclosed. During zooming, the 1st lens unit and 3rd lens unit move so as to be located closer to the object side at the telephoto end than at the wide-angle end. Then, by appropriately setting the amount of movements of the 1st lens unit, 2nd lens unit and 3rd lens unit during zooming, the overall length of the zoom lens system is reduced and excellent optical performance is realized.

18 Claims, 6 Drawing Sheets

ZOOM LENS SYSTEM AND CAMERA INCORPORATING THE SAME

BACKGROUND OF THE INVENTION

1. Field of the Invention

The present invention relates to a zoom lens system and a camera incorporating it and is preferably applicable to a video camera and a digital still camera, etc.

2. Description of the Related Art

With the recent reduction in size and weight of a home video camera, etc., remarkable progress has been made in the miniaturization of image-taking zoom lens systems and energies are devoted in particular to shortening overall lengths of the zoom lens system, reduction of the diameter of a front lens element and simplification of a lens structures.

As one of means for achieving these objects, a so-called "rear focusing type zoom lens system" which moves lens units other than a 1st lens unit closest to the object side to achieve focusing is known.

The 1st lens unit of a rear focusing type zoom lens system generally has a smaller effective diameter than a zoom lens system which moves the 1st lens unit to achieve focusing and facilitates the reduction of the overall zoom lens system. It also facilitates short distance image-taking or extremely short distance image-taking in particular. Moreover, since small and light lens units are moved, it has features such that only a small driving force is required for the lens units and quick focusing is allowed, etc.

A conventional rear focusing type zoom lens system which is proposed in Japanese Patent Application Laid-Open No. H7(1995)-270684 and Japanese Patent Application Laid-Open No. H11(1999)-305124 comprises four lens units; a 1st lens unit with positive optical power, 2nd lens unit with negative optical power, 3rd lens unit with positive optical power and 4th lens unit with positive optical power arranged in that order from the object side, performs magnification varying by moving the 2nd lens unit and moves the 4th lens unit to correct aberrations to the image plane accompanying the magnification varying and achieve focusing.

In order to improve the ability to store a camera when not in use, it is generally effective to adopt collapsible lens units. However, for the above described zoom type zoom lens system in which the 2nd lens unit has most of the variable-magnification function, the 1st lens unit and 2nd lens unit are too sensitive relating to eccentricity to be suitable for the use as the collapsible type lens units.

In contrast to this, there is a known optical system which is proposed in Japanese Patent Application Laid-Open No. H10(1998)-62687 provided with a zoom lens system having a magnification-varying ratio of about three times, which comprises four lens units; a 1st lens unit with positive optical power, 2nd lens unit with negative optical power, 3rd lens unit with positive optical power and 4th lens unit with positive optical power arranged in that order from the object side, wherein the 1st lens unit consists of a single lens element, zooming is carried out by moving the 2nd, 3rd and 4th lens units and focusing is performed by moving the 4th lens unit to thereby simplify the optical system and provide an optical system which is also suitable for a collapsible structure.

There is also a zoom lens system which is proposed in Japanese Patent Application Laid-Open No. 2001-194586 having a magnification-varying ratio of about three times, which consists of four lens units; a 1st lens unit with positive optical power, 2nd lens unit with negative optical power, 3rd lens unit with positive optical power and 4th lens unit with positive optical power arranged in that order from the object side, wherein the 1st lens unit consists of a single lens element and zooming is carried out by moving the 1st, 2nd, 3rd and 4th lens units.

In order to reduce the size of the optical system, attempting to increase optical power of each lens unit of the optical system and at the same time reduce the number of lens elements will increase the thickness of the lenses, make the effect of shortening the zoom lens system insufficient and make it difficult to correct various kinds of aberrations.

Furthermore, when the zoom lens system is not used, attempting to collapse each lens unit for mounting will inevitably result in more errors due to inclinations, etc., of the lens elements and the lens units for reasons related to their mechanical structure. For this reason, the large sensitivity of lens elements and lens units result in deterioration of optical performance and jitter of images during zooming, and therefore it is preferable to reduce the sensitivity of the lens elements and lens units to a smallest possible level.

Attempting to perform zooming by moving only the 2nd lens unit and 4th lens unit of the four-unit zoom lens system consisting of positive, negative, positive and positive refractive power lens elements will cause the 2nd lens unit to be responsible for most of the magnification-varying operation, which inevitably requires the optical power of the 1st lens unit and 2nd lens unit to be increased.

In contrast to this, the optical system disclosed in Japanese Patent Application Laid-Open No. H10(1998)-62687 includes the 1st lens unit and 2nd lens unit with relatively small sensitivity, and is therefore suitable for a collapsible structure. However, since the 1st lens unit is fixed during zooming, shortening of the overall length of the zoom lens system at the wide-angle end and reduction in the diameter of the front lens element are not necessarily sufficient.

On the other hand, the optical system disclosed in Japanese Patent Application Laid-Open No. 2001-194586 realizes a small system with a large diameter and high performance by moving the 1st lens unit during zooming. However, since the amount of movement of the 1st lens unit from the wide-angle end to the telephoto end during zooming is small, the entrance pupil cannot be made short enough at the wide-angle end and the diameter of the front lens element (the lens element closest to the object) cannot necessarily be reduced enough, either.

SUMMARY OF THE INVENTION

It is an object of the present invention to provide a zoom lens system which realizes the reduction of the overall length of the zoom lens system by appropriately setting the amount of movement of each lens unit during zooming and which has high optical performance in an entire zooming range from the wide-angle end to the telephoto end.

In order to attain the above described object, one aspect of the zoom lens system of the present invention comprises in order from an object side to an image side a 1st lens unit with positive optical power which consists of one lens element, a 2nd lens unit with negative optical power, a 3rd lens unit with positive optical power, and a 4th lens unit with positive optical power. The 1st lens unit and the 3rd lens unit move so as to be located closer to the object side at the telephoto end than the wide-angle end, and the following conditions are satisfied:

$$1.0 < |M1/M2| < 7.0$$

$$2.0 < |M3/M2| < 8.0$$

where M1, M2 and M3 are the maximum amounts of movement of the 1st lens unit, 2nd lens unit and 3rd lens unit in the direction of the optical axis during zooming from the wide-angle end to the telephoto end, respectively.

A detailed configuration of the zoom lens system and the camera incorporating the same of the invention, the above and other objects and features of the invention will be apparent from the embodiments, described below.

DETAILED DESCRIPTION OF THE PREFERRED EMBODIMENTS

Embodiments of the zoom lens system and camera according to the present invention will be explained below with reference to the drawings.

Figure 1:
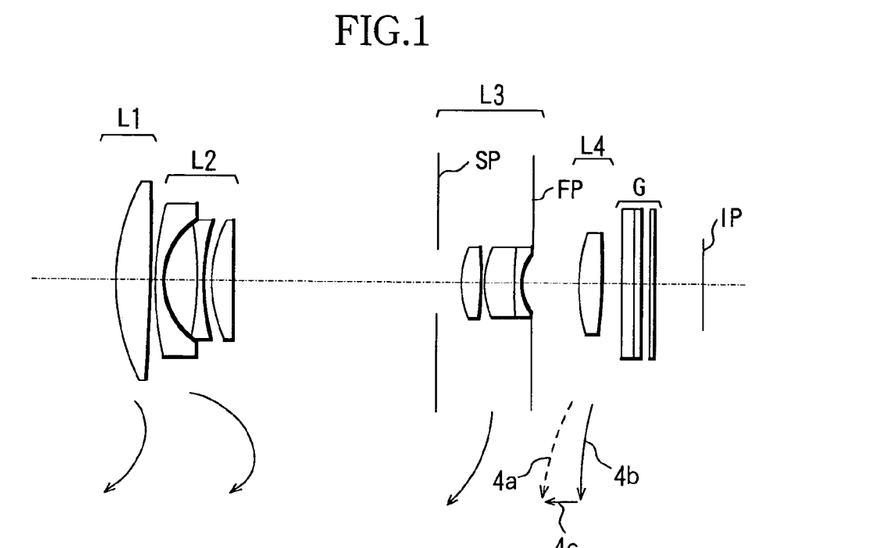
FIG. 1 is a sectional view of a zoom lens system according to Embodiment 1 at a wide-angle end.
Figure 2:
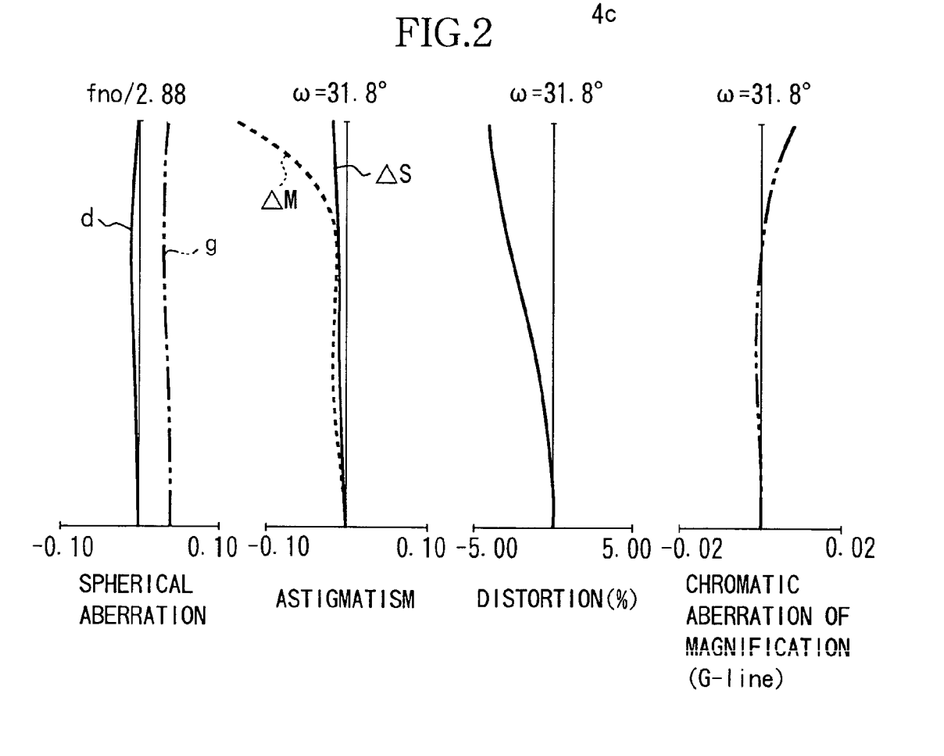
FIG. 2 is an aberration diagram of the zoom lens system according to Embodiment 1 at the wide-angle end.
Figure 3:
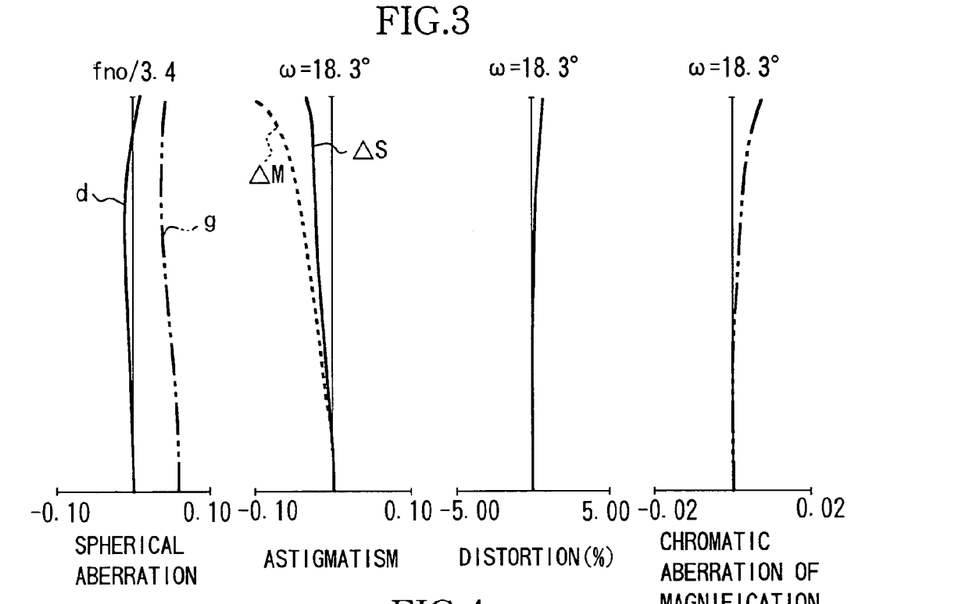
FIG. 3 is an aberration diagram of the zoom lens system according to Embodiment 1 at an intermediate zooming position.
Figure 4:
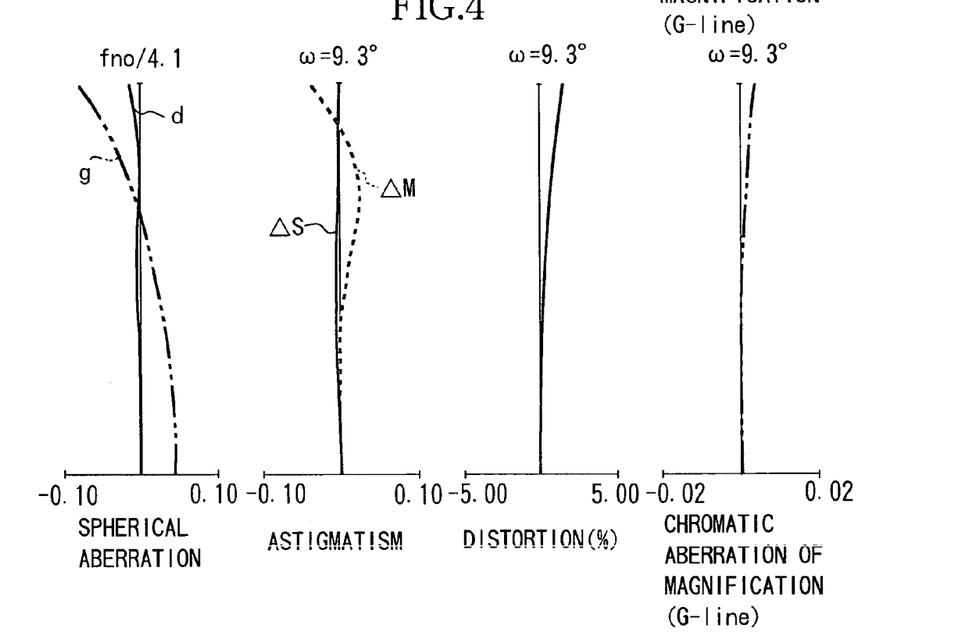
FIG. 4 is an aberration diagram of the zoom lens system according to Embodiment 1 at a telephoto end.

FIG. 1 is a sectional view of main components of a zoom lens system according to Embodiment 1 of the present invention and FIGS. 2 to 4 are aberration diagrams of the zoom lens system according to Embodiment 1 of the present invention at a wide-angle end, an intermediate focal length and a telephoto end, respectively.

Figure 5:
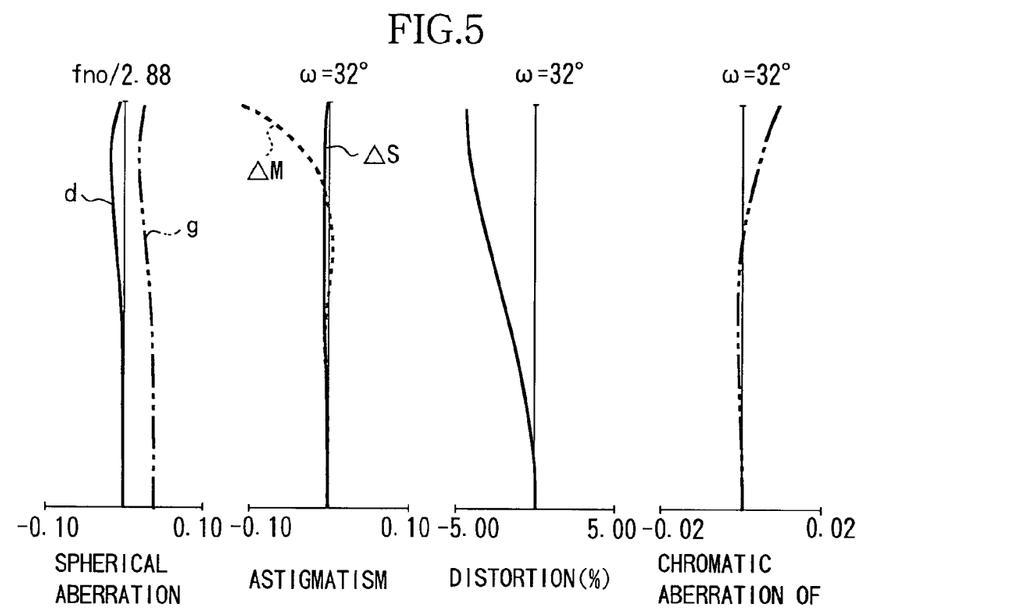
FIG. 5 is an aberration diagram of a zoom lens system according to Embodiment 2 at the wide-angle end.
Figure 6:
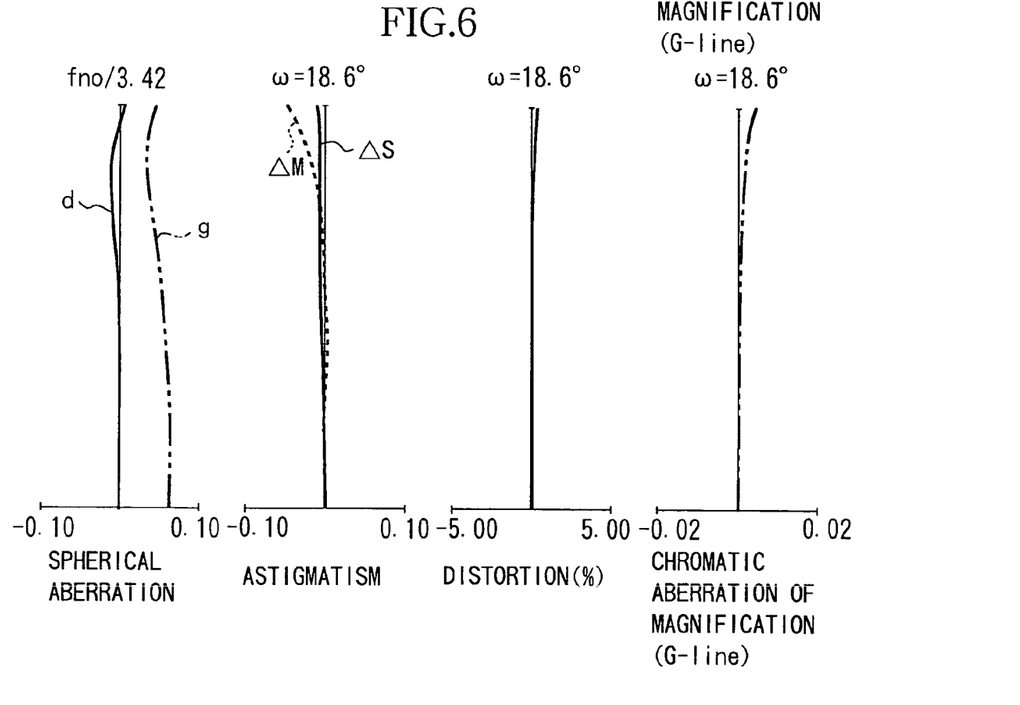
FIG. 6 is an aberration diagram of the zoom lens system according to Embodiment 2 at an intermediate zooming position.
Figure 7:
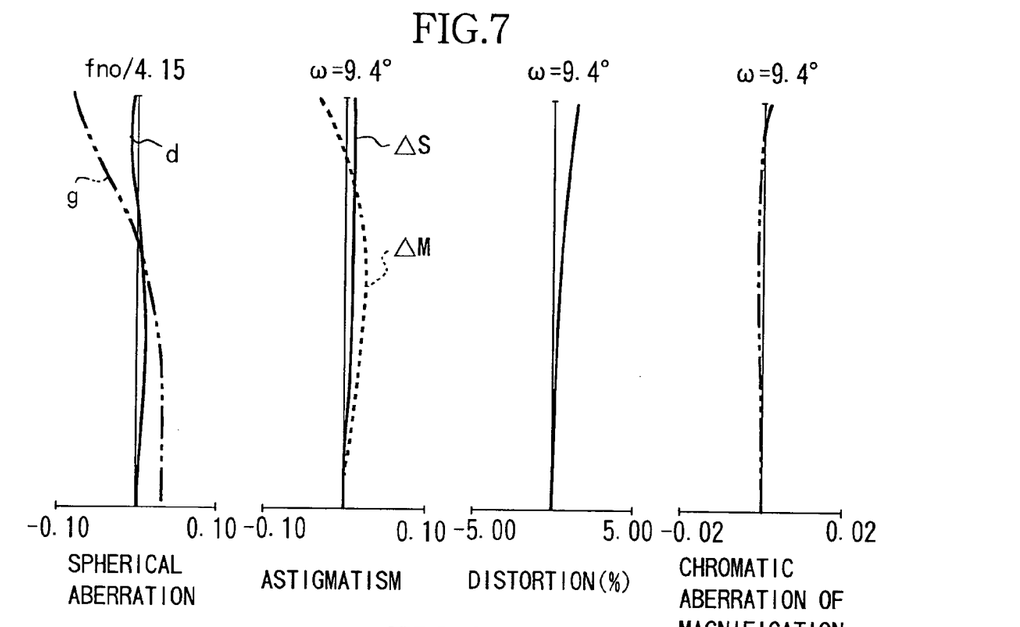
FIG. 7 is an aberration diagram of the zoom lens system according to Embodiment 2 at the telephoto end.

FIGS. 5 to 7 are aberration diagrams of a zoom lens system according to Embodiment 2 of the present invention at a wide-angle end, an intermediate focal length and a telephoto end, respectively.

Figure 8:
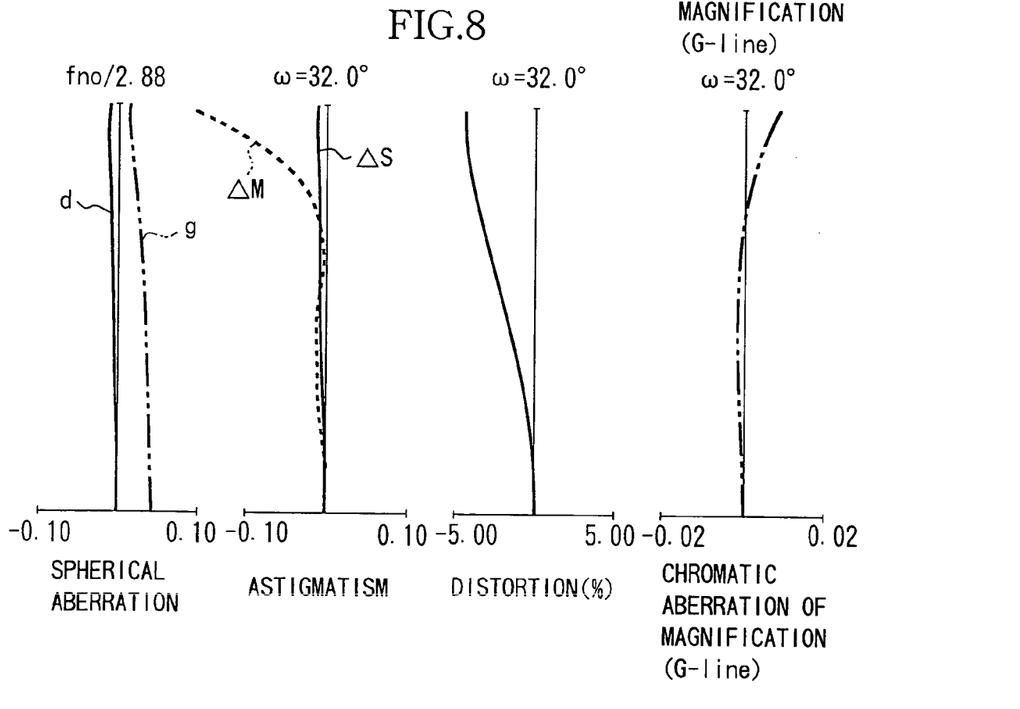
FIG. 8 is an aberration diagram of a zoom lens system according to Embodiment 3 at the wide-angle end.
Figure 9:
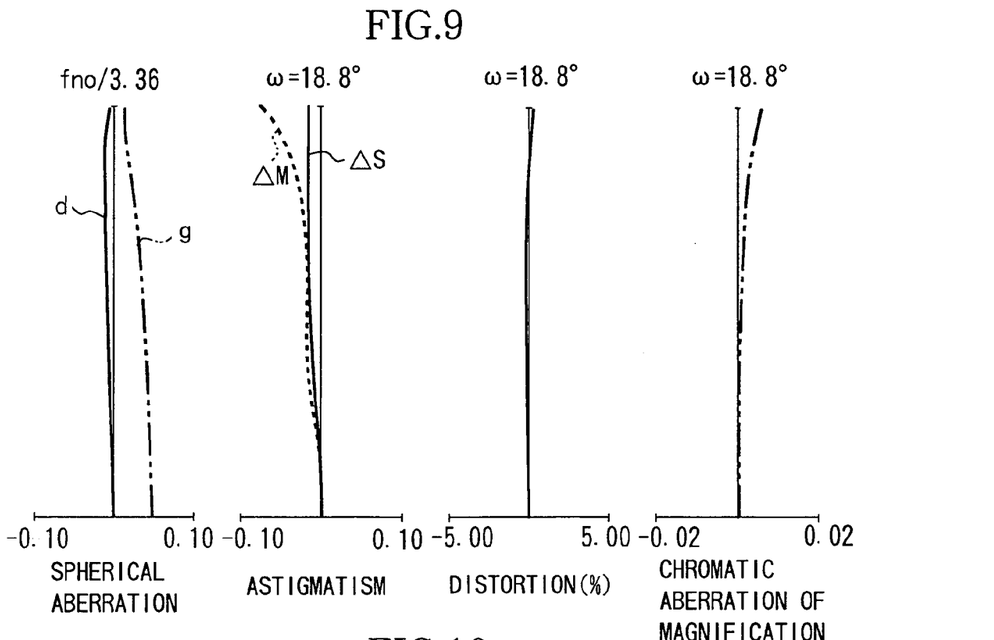
FIG. 9 is an aberration diagram of the zoom lens system according to Embodiment 3 at an intermediate zooming position.
Figure 10:
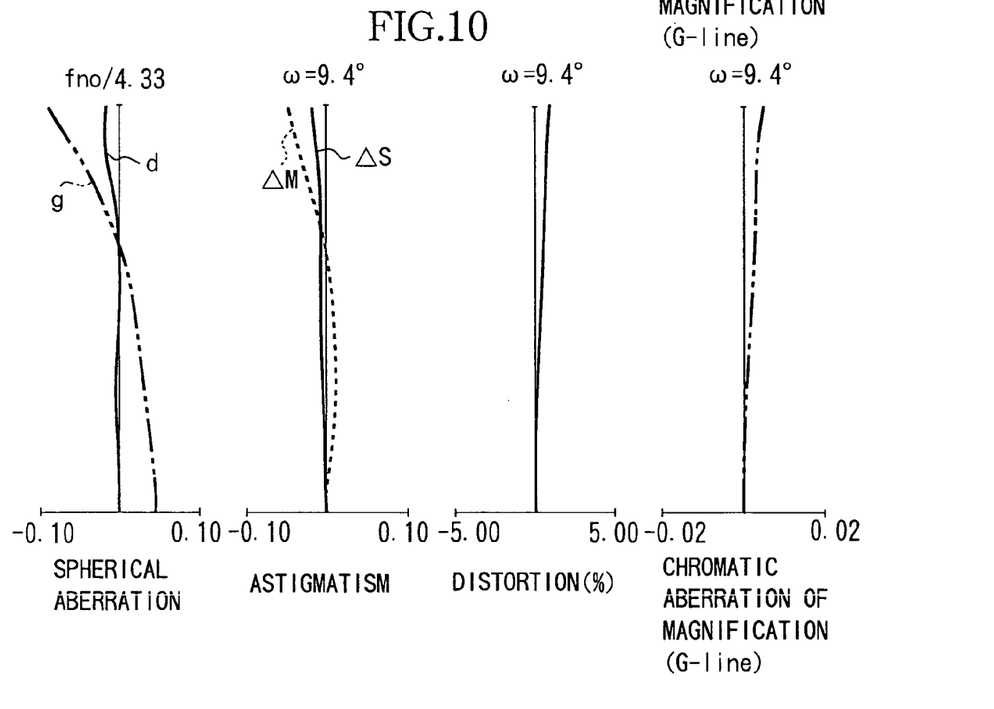
FIG. 10 is an aberration diagram of the zoom lens system according to Embodiment 3 at the telephoto end.

FIGS. 8 to 10 are aberration diagrams of a zoom lens system according to Embodiment 3 of the present invention at a wide-angle end, an intermediate focal length and a telephoto end, respectively.

Since the rough structures of Embodiments 2 and 3 are similar to the structure of Embodiment 1, their sectional views are omitted. Specific data will be defined in numerical examples which will be described later.

In the sectional view of the zoom lens system lens elements shown in FIG. 1, reference numeral L1 denotes a 1st lens unit with positive optical power (optical power=reciprocal of focal length), L2 denotes a 2nd lens unit with negative optical power, L3 denotes a 3rd lens unit with positive optical power and L4 denotes a 4th lens unit with positive optical power. Reference character SP denotes an aperture stop, which is located before the 3rd lens unit L3.

Reference character G corresponds to an optical filter or face plate, etc., which is an optical block provided from the standpoint of optical design. Reference character IP denotes an image-pickup plane of a solid image-pickup element (photoelectric conversion element) such as a CCD sensor or CMOS sensor is located. Reference character FP denotes a flare cutting stop, which is located on the image side of the 3rd lens unit L3 to cut unnecessary light.

In the aberration diagrams, reference characters d and g denote a d-line and g-line, ΔM and ΔS denote a meridional image plane and a sagittal image plane, and chromatic aberration of magnification is expressed by the g-line.

In each embodiment, each lens unit is moved during zooming from the wide-angle end to the telephoto end as indicated by the arrow in FIG. 1.

The wide-angle end and telephoto end refer to the zooming positions when a magnification varying lens unit is mechanically located at either end of an allowable range of movement in the direction of the optical axis.

According to Embodiments 1 to 3, during zooming from the wide-angle end to the telephoto end, the 1st lens unit L1 moves to the object side along a track (locus) which is convex toward the image side. The 3rd lens unit L3 moves to the object side. The 4th lens unit L4 moves along a track which is convex toward the object side. The 2nd lens unit L2 moves along a track which is convex toward the image side to correct variation in the image plane caused by magnification varying.

The 1st lens unit L1 and 3rd lens unit L3 move in such a way as to be located closer to the object side at the telephoto end than at the wide-angle end.

As shown above, in each embodiment, the 1st lens unit L1 is moved during zooming to shorten the overall length of the zoom lens system at the wide-angle end and realize miniaturization of the system in the direction of the optical axis.

Furthermore, the embodiments adopt a rear focusing system whereby focusing is performed by moving the 4th lens unit L4 on the optical axis. When focusing is performed at the telephoto end from an object at infinity to an object at a short distance, focusing is achieved by moving the 4th lens unit L4 forward as shown by the arrow 4c in FIG. 1. A solid curve 4a and dotted curve 4b of the 4th lens unit L4 indicate moving tracks to correct variation in the image plane caused by magnification varying from the wide-angle end to the telephoto end when focusing on the object at infinity and the object at the short distance, respectively. In each embodiment, the use of the light 4th lens unit L4 for focusing facilitates speedy automatic focusing (auto-focusing).

During zooming, the aperture stop SP may be moved together with the 3rd lens unit L3 as one body, may be moved separately or may be fixed. Uniting it with the 3rd lens unit L3 reduces the number of units that can be separated as moving/movable units, and simplifying the mechanical structure more easily. Furthermore, when it is moved separately from the 3rd lens unit L3, it is advantageous for reducing the diameter of the front lens element (1st lens element). When the aperture stop SP is fixed, it is possible to reduce the driving torque of the actuator and is advantageous in terms of power saving.

Since the 1st lens unit L1 has a large effective lens diameter, consisting of a single lens element makes it possible to reduce the weight of the 1st lens unit L1 and reduce the load of the actuator for movement.

The 2nd lens unit L2 consists of three independent single lens elements; a meniscus negative lens element whose convex surface is faced toward the object side, a negative lens element whose both lens surfaces are concave and a positive lens element whose object-side surface is convex. This structure effectively reduces variation in aberration during zooming and especially corrects distortion aberration at the wide-angle end and spherical aberration at the telephoto end.

The 3rd lens unit L3 consists of two positive lens elements and a negative lens element whose image side-surface is concave in order from the object side. Reducing the distance between principal points of the 2nd lens unit L2 and 3rd lens unit L3 results in a reduction of the length of the rear side portion of the zoom lens system from the 3rd lens unit. The 3rd lens unit L3 has one or more aspherical surfaces. This makes it possible to effectively correct aberration variation when zooming.

The 4th lens unit L4 consists of a single positive lens element whose object side surface is convex. To correct variation such as spherical aberration by focusing, the 4th lens unit L4 has one or more aspherical surfaces.

During zooming, in each embodiment, by moving the 3rd lens unit L3 toward the object side, the 3rd lens unit L3 with a main magnification varying effect and further moves the 1st lens unit L1 with positive optical power toward the object side to also provide the 2nd lens unit L2 is also provided with a magnification varying effect. Thereby, a zoom ratio of about four times is achieved without substantially increasing optical power of the 1st lens unit L1 and 2nd lens unit L2.

In order for each embodiment to maintain optical performance and at the same time reduce the overall length of the zoom lens system and reduce the size of the effective diameter of the front lens unit:

The zoom lens system in each embodiment is satisfied at least one of the following conditions:

$$1.0 < |M1/M2| < 7.0 \quad (1)$$

$$2.0 < |M3/M2| < 8.0 \quad (2)$$

$$0.7 < |f2/\sqrt{(fw \cdot ft)}| < 1.0 \quad (3)$$

$$0.6 < (\beta 3t \cdot fw)/(\beta 3w \cdot ft) < 1.2 \quad (4)$$

$$0.9 < f3/\sqrt{(fw \cdot ft)} < 1.5 \quad (5)$$

$$0.75 < (Rb+Ra)/(Rb-Ra) < 1.2 \quad (6)$$

where M1, M2 and M3 denote maximum amounts of movement of the 1st lens unit L1, 2nd lens unit L2 and 3rd lens unit L3 in the direction of the optical axis during zooming from the wide-angle end to the telephoto end, respectively;

fw and ft denote focal lengths of the entire zoom lens system at the wide-angle end and telephoto end, respectively;

f2 and f3 denote focal lengths of the 2nd lens unit L2 and 3rd lens unit L3, respectively;

$\beta 3w$ and $\beta 3t$ denote lateral magnification of the 3rd lens unit L3 at the wide-angle end and telephoto end when focusing is achieved at an object at infinity, respectively; and Ra and Rb denote curvature radii of both surfaces on the object side and the image side of the 1st lens element constituting the 1st lens unit, in which the both surfaces are spherical, respectively.

Satisfying one of these conditional expressions, the corresponding effects are obtained.

Here, for the maximum amounts of movement M1, M2 and M3, the movement from the object side to the image side is assigned a "positive" sign and the movement opposite thereto is assigned a "negative" sign. When the movement of the lens unit is reciprocating movement or convex-curve movement, they refer to maximum amounts of movement along the direction of the optical axis.

Then, the technical meanings of the respective conditional expressions will be explained.

When the amount of movement of the 1st lens unit L1 decreases beyond the lower limit of conditional expression (1) during zooming, the distance from the front lens element to the entrance pupil does not become short enough at the wide-angle end, making it difficult to reduce the diameter of the front lens element. On the contrary, when the amount of movement of the 1st lens unit L1 increases excessively beyond the upper limit of conditional expression (1), the angle of the cam for driving the 1st lens unit increases and the load necessary for the actuator increases, which is undesirable.

When the amount of movement of the 3rd lens unit L3 decreases beyond the lower limit of conditional expression (2) during zooming, it is necessary to increase the optical power of the 3rd lens unit L3 to obtain a sufficient zoom ratio and deterioration of the optical performance due to manufacturing errors of the lens barrel increases. On the contrary, when the amount of movement of the 3rd lens unit L3 increases beyond the upper limit of conditional expression (2), variation of the exit pupil during zooming increases, causing shading in a solid image pickup element such as a CCD sensor, which is undesirable.

The conditional expression (3) is intended to appropriately set the optical power of the 2nd lens unit L2, reduce the amount of movement of each lens unit necessary for zooming and prevent from deterioration of performance caused by manufacturing errors and vibration of images during magnification varying, due to the excessive sensitivity.

When the optical power of the 2nd lens unit L2 becomes too small beyond the lower limit of conditional expression (3), the optical performance deteriorates due to influences of manufacturing errors and vibration of images during zooming increases, which is undesirable. On the contrary, when the upper limit of conditional expression (3) is exceeded, the amount of movement of each lens unit necessary for zooming increases excessively, failing to realize the reduction of the overall length of the zoom lens system.

When the contribution of the 3rd lens unit L3 to magnification varying decreases beyond the lower limit of conditional expression (4), it is necessary to increase optical power of the 1st lens unit L1 and 2nd lens unit L2 to secure the zoom ratio of the entire system of the zoom lens system, resulting in an increase in the sensitivity and an increase of influences of manufacturing errors. On the contrary, when the upper limit of conditional expression (4) is exceeded, the amount of movement of the 3rd lens unit L3 increases and the overall length of the zoom lens system at the wide-angle end also increases, which is undesirable.

When the optical power of the 3rd lens unit L3 increases excessively beyond the lower limit of conditional expression (5), the Petzval sum increases excessively in the positive direction and the curvature of field increases in the negative direction, which is undesirable. On the contrary, when the optical power of the 3rd lens unit L3 decreases excessively beyond the upper limit of conditional expression (5), the amount of movement of the 3rd lens unit necessary for zooming increases excessively, making it difficult to reduce the size of the zoom lens system.

When the lower limit of conditional expression (6) is exceeded, correction of distortion aberration at the wide-angle end becomes insufficient, which is undesirable. On the contrary, when the upper limit of conditional expression (6) is exceeded, it is difficult to correct distortion aberration at the telephoto end, which is undesirable.

To reduce the size of the entire zoom lens system while correcting aberrations sufficiently and reducing aberration variation during zooming in each embodiment, it is preferable to set numerical ranges of conditional expressions (1) to (6) as follows:

$$2.5 < |M1/M2| < 6.0 \quad (1a)$$

$$3.5 < |M3/M2| < 7.0 \quad (2a)$$

$$0.75 < f2/\sqrt{(fw \cdot ft)} < 0.9 \quad (3a)$$

$$0.7 < (\beta 3t \cdot fw)/(\beta 3w \cdot ft) < 1.1 \quad (4a)$$

$$1.0 < f3/\sqrt{(fw \cdot ft)} < 1.35 \quad (5a)$$

$$0.85 < (Rb+Ra)/(Rb-Ra) < 1.1 \quad (6a)$$

Then, numerical data of numerical examples 1 to 3 corresponding to Embodiments 1 to 3 of the present invention, respectively, will be explained below. In each numerical example, reference character i denotes an order of optical surface from the object side, Ri denotes a radius of curvature of an i-th optical surface (i-th surface), Di denotes a distance between the i-th surface and (i+1)-th surface, Ni and νi denote a refractive index and Abbe number of the material of the i-th optical member with respect to the d-line. Furthermore, when a reference character k denotes a conic constant, B, C, D and E denotes aspherical coefficient and x denotes displacement in the direction of the optical axis at the position of height h from the optical axis with respect to a vertex of the surface, the aspherical surface shape is expressed by:

$$x = \frac{(1/R)h^2}{1 + \sqrt{\{1 - (1+k)(h/R)^2\}}} + Bh^4 + Ch^6 + Dh^8 + Eh^{10}$$

where R denotes a paraxial radius of curvature. Furthermore, an expression [e-Z] means $[10^{-Z}]$. The correspondence with the above described expressions in each numerical example is shown in Table 1. Reference character f denotes a focal length, Fno denotes an F number and ω denotes a half field angle.

In the numerical example, reference numerals R18 to R28 denote glass blocks such as a filter.

NUMERICAL EXAMPLE 1

| | | | |
|---|---|---|---|
| f = 7.25-27.37 | Fno = 2.88-4.14 | 2ω = 63.6°-18.7° | |
| R1 = 22.759 | D1 = 3.15 | N1 = 1.487490 | ν1 = 70.2 |
| R2 = -2034.981 | D2 = Variable | | |
| R3 = 34.792 | D3 = 0.80 | N2 = 1.882997 | ν2 = 40.8 |
| R4 = 7.444 | D4 = 3.22 | | |
| R5 = -42.087 | D5 = 0.70 | N3 = 1.834807 | ν3 = 42.7 |
| R6 = 23.117 | D6 = 0.75 | | |
| R7 = 15.192 | D7 = 2.00 | N4 = 1.846660 | ν4 = 23.9 |
| R8 = 544.069 | D8 = Variable | | |
| R9 = Stop | D9 = 2.30 | | |
| R10 = 9.638 (aspherical) | D10 = 2.00 | N5 = 1.693500 | ν5 = 53.2 |
| R11 = -52.703 | D11 = 0.30 | | |
| R12 = 10.505 | D12 = 2.80 | N6 = 1.696797 | ν6 = 55.5 |
| R13 = 41.930 | D13 = 0.80 | N7 = 1.846660 | ν7 = 23.9 |
| R14 = 5.804 | D14 = 1.00 | | |
| R15 = Flare cutting stop | D15 = Variable | | |
| R16 = 19.204 (aspherical) | D16 = 2.20 | N8 = 1.743300 | ν8 = 49.3 |
| R17 = -76.854 | D17 = 1.74 | | |
| R18 = ∞ | D18 = 1.20 | N9 = 1.516330 | ν9 = 64.2 |
| R19 = ∞ | D19 = 0.72 | N10 = 1.552320 | ν10 = 63.5 |
| R20 = ∞ | D20 = 0.80 | | |
| R21 = ∞ | D21 = 0.50 | N11 = 1.503780 | ν11 = 66.9 |
| R22 = ∞ | D22 = 0.80 | | |
| R23 = ∞ | | | |

| Variable | Focal length | | |
|---|---|---|---|
| distance | 7.25 | 19.07 | 27.37 |
| D2 | 0.60 | 10.45 | 14.07 |
| D8 | 19.55 | 4.55 | 1.20 |
| D15 | 4.46 | 8.87 | 14.18 |

-continued

Aspherical coefficient

| R10 | k = −3.12891e+00 | B = 2.87957e−04 | C = −3.68374e−06 | D = 3.71543e−08 |
|---|---|---|---|---|
| | E = 0.00000e+00 | | | |
| R16 | k = 8.31573e+00 | B = −1.72978e−04 | C = −2.89389e−06 | D = 2.66348e−08 |
| | E = −2.41113e−09 | | | |

NUMERICAL EXAMPLE 2

| f = 7.20-27.20 | Fno = 2.88-4.15 | 2ω = 64.0°-18.8° | |
|---|---|---|---|
| R1 = 23.371 | D1 = 3.15 | N1 = 1.487490 | ν1 = 70.2 |
| R2 = −1804.355 | D2 = Variable | | |
| R3 = 31.519 | D3 = 0.80 | N2 = 1.882997 | ν2 = 40.8 |
| R4 = 7.308 | D4 = 3.25 | | |
| R5 = −36.300 | D5 = 0.70 | N3 = 1.834807 | ν3 = 42.7 |
| R6 = 23.980 | D6 = 0.78 | | |
| R7 = 15.589 | D7 = 2.00 | N4 = 1.846660 | ν4 = 23.9 |
| R8 = −782.542 | D8 = Variable | | |
| R9 = Stop | D9 = 2.30 | | |
| R10 = 9.632 | D10 = 2.00 | N5 = 1.693500 | ν5 = 53.2 |
| R11 = −51.274 | D11 = 0.30 | | |
| R12 = 11.200 | D12 = 2.98 | N6 = 1.712995 | ν6 = 53.9 |
| R13 = 55.539 | D13 = 0.60 | N7 = 1.846660 | ν7 = 23.9 |
| R14 = 5.973 | D14 = 1.20 | | |
| R15 = Flare cutting stop | D15 = Variable | | |
| R16 = 17.379 | D16 = 2.20 | N8 = 1.743300 | ν8 = 49.3 |
| R17 = −106.588 | D17 = 1.74 | | |
| R18 = ∞ | D18 = 1.20 | N9 = 1.516330 | ν9 = 64.2 |
| R19 = ∞ | D19 = 0.72 | N10 = 1.552320 | ν10 = 63.5 |
| R20 = ∞ | D20 = 0.80 | | |
| R21 = ∞ | D21 = 0.50 | N11 = 1.503780 | ν11 = 66.9 |
| R22 = ∞ | D22 = 0.80 | | |
| R23 = ∞ | | | |

| Variable distance | Focal length | | |
|---|---|---|---|
| | 7.20 | 18.63 | 27.20 |
| D2 | 0.60 | 10.43 | 14.85 |
| D8 | 19.32 | 4.52 | 1.22 |
| D15 | 4.26 | 9.35 | 15.00 |

Aspherical coefficient

| R10 | k = −3.34103e+00 | B = 3.12676e−04 | C = −3.48836e−06 | D = 6.45099e−09 |
|---|---|---|---|---|
| | E = 0.00000e+00 | | | |
| R16 | k = 5.29252e+00 | B = −1.65332e−04 | C = −1.27032e−06 | D = 2.01232e−08 |
| | E = −6.82357e−10 | | | |

NUMERICAL EXAMPLE 3

| f = 7.20-27.21 | Fno = 2.88-4.33 | 2ω = 64.0°-18.8° | |
|---|---|---|---|
| R1 = 20.930 | D1 = 3.15 | N1 = 1.487490 | ν1 = 70.2 |
| R2 = 2752.280 | D2 = Variable | | |
| R3 = 31.598 | D3 = 0.80 | N2 = 1.882997 | ν2 = 40.8 |
| R4 = 7.156 | D4 = 3.48 | | |
| R5 = −25.291 | D5 = 0.70 | N3 = 1.785896 | ν3 = 44.2 |
| R6 = 27.764 | D6 = 0.50 | | |
| R7 = 16.001 | D7 = 2.00 | N4 = 1.846660 | ν4 = 23.9 |
| R8 = −168.129 | D8 = Variable | | |
| R9 = Stop | D9 = 2.30 | | |
| R10 = 9.600 (aspherical) | D10 = 2.10 | N5 = 1.693500 | ν5 = 53.2 |
| R11 = −38.730 | D11 = 0.20 | | |
| R12 = 10.495 | D12 = 1.91 | N6 = 1.712995 | ν6 = 53.9 |

-continued

| | | | |
|---|---|---|---|
| R13 = 47.418 | D13 = 1.99 | N7 = 1.846660 | ν7 = 23.9 |
| R14 = 5.517 | D14 = 0.65 | | |
| R15 = Flare cutting stop | D15 = Variable | | |
| R16 = 14.561 (aspherical) | D16 = 2.30 | N8 = 1.743300 | ν8 = 49.3 |
| R17 = −2184.494 | D17 = 1.74 | | |
| R18 = ∞ | D18 = 1.20 | N9 = 1.516330 | ν9 = 64.2 |
| R19 = ∞ | D19 = 0.72 | N10 = 1.552320 | ν10 = 63.5 |
| R20 = ∞ | D20 = 0.80 | | |
| R21 = ∞ | D21 = 0.50 | N11 = 1.503780 | ν11 = 66.9 |
| R22 = ∞ | D22 = 0.80 | | |
| R23 = ∞ | | | |

| Variable | Focal length | | |
|---|---|---|---|
| distance | 7.20 | 18.35 | 27.21 |
| D2 | 0.60 | 9.35 | 12.72 |
| D8 | 18.07 | 4.25 | 1.21 |
| D15 | 5.56 | 10.49 | 16.72 |

| Aspherical factor | | | | |
|---|---|---|---|---|
| R10 | k = −1.92656e+00 E = −5.09651e−09 | B = 1.01352e−04 | C = −1.91788e−06 | D = 1.28489e−07 |
| R16 | k = 3.86443e+00 E = −3.59309e−09 | B = −1.72382e−04 | C = −4.08617e−06 | D = 9.37986e−08 |

TABLE 1

| | Embodiment 1 | Embodiment 2 | Embodiment 3 |
|---|---|---|---|
| |M1/M2| | 3.090 | 5.285 | 3.239 |
| |M3/M2| | 4.524 | 6.867 | 4.899 |
| |f2/√(fw·ft)| | 0.817 | 0.829 | 0.805 |
| (β3t · fw)/(β3w · ft) | 1.033 | 1.030 | 0.781 |
| f3/(fw · ft) | 1.200 | 1.237 | 1.103 |
| (Rb + Ra)/(Rb − Ra) | 0.978 | 0.974 | 1.015 |

As shown above, the foregoing embodiments use a zoom lens system in a four-unit structure of positive, negative, positive and positive optical power lens units to perform zooming by moving all the lens units and achieve the reduction of the overall length of the zoom lens system while keeping the optical performance optimal by appropriately setting the amount of movement of the respective lens units and optical power distribution as described above.

Especially, these embodiments realize a zoom lens system having a high zoom ratio with a high zoom ratio of 4 or higher and an F number of approximately 2.8 or higher and a large aperture ratio intended to reduce the size of the entire zoom lens system while keeping favorable optical performance.

Figure 11:
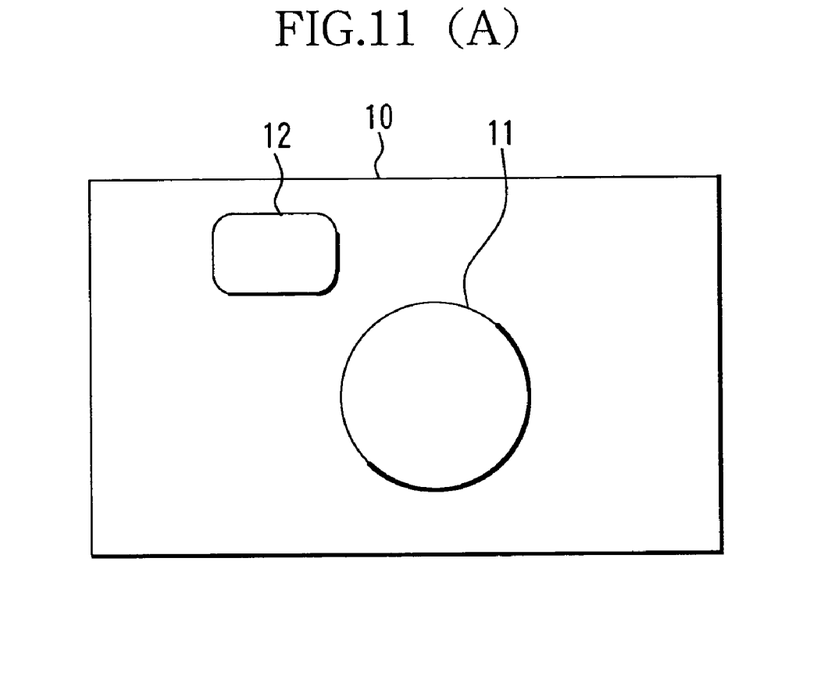
FIG. 11 is a schematic diagram of main components of a camera.

Then, an embodiment of a digital still camera (optical apparatus) provided with the zoom lens system according to Embodiments 1 to 3 will be explained using FIG. 11.

FIG. 11(A) shows a front view of a digital still camera and FIG. 11(B) is a sectional view of its side. In the figure, reference numeral 10 denotes a camera body (housing), 11 denotes an image-taking optical system using one of the zoom lens systems according to the numerical examples 1 to 3, 12 denotes a finder optical system and 13 denotes a solid image pickup element (photoelectric conversion element) such as a CCD sensor and CMOS sensor. The solid image pickup element 13 receives an image of an object formed by the image-taking optical system 11 and converts it to electrical information. The image information of the object converted to the electrical information is recorded in a storage section (not shown).

Thus, applying the zoom lens system according to Embodiments 1 to 3 to an image-taking optical system of a digital still camera can realize a compact image-taking apparatus.

While preferred embodiments have been described, it is to be understood that modification and variation of the present invention may be made without departing from scope of the following claims.

What is claimed is:

1. A zoom lens system comprising, in order from an object side to an image side:
   a 1st lens unit with positive optical power, the first lens unit consisting of one lens element;
   a 2nd lens unit with negative optical power;
   a 3rd lens unit with positive optical power; and
   a 4th lens unit with positive optical power,
   wherein the 1st lens unit and the 3rd lens unit move so as to be located closer to the object side at the telephoto end than the wide-angle end, and the following conditions are satisfied:

$$3.09 \leq |M1/M2| < 7.0$$

$$2.0 < |M3/M2| < 8.0$$

where M1, M2 and M3 are the maximum amounts of movement of the 1st lens unit, 2nd lens unit and 3rd lens unit in the direction of the optical axis during zooming from the wide-angle end to the telephoto end, respectively.

2. The zoom lens system according to claim 1, wherein the 2nd lens unit consists of two negative lens elements and one positive lens element.

3. The zoom lens system according to claim 1, wherein further the following condition is satisfied:

$$0.7 < |f2/\sqrt{(fw \cdot ft)}| < 1.0$$

where fw and ft are the focal lengths of the entire zoom lens system at the wide-angle end and telephoto end, respectively, and f2 is the focal length of the 2nd lens unit.

4. The zoom lens system according to claim 1, wherein further the following condition is satisfied:

$$0.6<(\beta 3t \cdot fw)/(\beta 3w \cdot ft)<1.2$$

where fw and ft are the focal lengths of the entire zoom lens system at the wide-angle end and telephoto end, respectively, and β3w and β3t are the lateral magnifications at the wide-angle end and telephoto end of the 3rd lens unit when focused at an object at infinity, respectively.

5. The zoom lens system according to claim 1, wherein the 4th lens unit is moved to perform focusing.

6. The zoom lens system according to claim 1, wherein the 3rd lens unit includes one or more aspherical surfaces.

7. The zoom lens system according to claim 1, wherein the 4th lens unit includes one or more aspherical surfaces.

8. The zoom lens system according to claim 1, wherein further the following condition is satisfied:

$$0.9<f3/\sqrt{(fw \cdot ft)}<1.5$$

where fw and ft are the focal lengths of the entire zoom lens system at the wide-angle end and telephoto end, respectively, and f3 is the focal length of the 3rd lens unit.

9. The zoom lens system according to claim 1, wherein both surfaces on the object side and the image side of the lens element constituting the 1st lens unit are spherical, and further the following condition is satisfied:

$$0.75<(Rb+Ra)/(Rb-Ra)<1.2$$

where Ra is the radius of curvature of the object side surface of the lens element constituting the 1st lens unit, and Rb is the radius of curvature of the image side surface of that one lens element.

10. The zoom lens system according to claim 1, wherein the zoom lens system forms an image on a solid-state image-pickup element.

11. A camera comprising:
the zoom lens system according to claim 1; and
a solid-state image-pickup element which receives an image formed by the zoom lens system.

12. A zoom lens system comprising, in order from an object side to an image side:
a 1st lens unit with positive optical power, the first lens unit consisting of one lens element and both surfaces on the object side and the image side of the one lens element being spherical;
a 2nd lens unit with negative optical power;
a 3rd lens unit with positive optical power; and
a 4th lens unit with positive optical power,
wherein the 1st lens unit and the 3rd lens unit move so as to be located closer to the object side at the telephoto end than the wide-angle end, and the following conditions are satisfied:

$$1.0<|M1/M2|<7.0$$

$$3.5<|M3/M2|<7.0$$

$$0.75(Rb+Ra)/(Rb-Ra)<1.2$$

where M1, M2 and M3 are the maximum amounts of movement of the 1st lens unit, 2nd lens unit and 3rd lens unit in the direction of the optical axis during zooming from the wide-angle end to the telephoto end, respectively, Ra is the radius of curvature of the object side surface of the one lens element constituting the 1st lens unit, and Rb is the radius of curvature of the image side surface of that one lens element.

13. The zoom lens system according to claim 12, wherein the 2nd lens unit consists of two negative lens elements and one positive lens element.

14. The zoom lens system according to claim 12, wherein further the following condition is satisfied:

$$0.7<|f2|/\sqrt{(fw \cdot ft)}|<1.0$$

where fw and ft are the focal lengths of the entire zoom lens system at the wide-angle end and telephoto end, respectively, and f2 is the focal length of the 2nd lens unit.

15. The zoom lens system according to claim 12, wherein further the following condition is satisfied:

$$0.6<(\beta 3t \cdot fw)/(\beta 3w \cdot ft)<1.2$$

where fw and ft are the focal lengths of the entire zoom lens system at the wide-angle end and telephoto end, respectively, and β3w and β3t are the lateral magnifications at the wide-angle end and telephoto end of the 3rd lens unit when focused at an object at infinity, respectively.

16. The zoom lens system according to claim 12, wherein further the following condition is satisfied:

$$0.9<f3/\sqrt{(fw \cdot ft)}<1.5$$

where fw and ft are the focal lengths of the entire zoom lens system at the wide-angle end and telephoto end, respectively, and f3 is the focal length of the 3rd lens unit.

17. The zoom lens system according to claim 12, wherein the zoom lens system forms an image on a solid-state image-pickup element.

18. A camera comprising:
the zoom lens system according to claim 12; and
a solid-state image-pickup element which receives an image formed by the zoom lens system.

* * * * *

UNITED STATES PATENT AND TRADEMARK OFFICE
CERTIFICATE OF CORRECTION

PATENT NO. : 7,365,913 B2
APPLICATION NO. : 10/665078
DATED : April 29, 2008
INVENTOR(S) : Hiroyuki Hamano It is certified that error appears in the above-identified patent and that said Letters Patent is hereby corrected as shown below:

On the Title page

(75) Inventors

Please delete "Hiroyuyki Hamano" and insert therefor --Hiroyuki Hamano--.

Signed and Sealed this

Eighth Day of July, 2008

JON W. DUDAS
*Director of the United States Patent and Trademark Office*